United States Patent [19]

Gilg et al.

[11] Patent Number: 5,290,867
[45] Date of Patent: Mar. 1, 1994

[54] PROCESS FOR PRODUCING AN EMULSION GRAFT COPOLYMER

[75] Inventors: Bernard Gilg, St. Louis-La-Chausee, France; Kurt Stinsky, Basel, Switzerland

[73] Assignee: Ciba-Geigy Corporation, Ardsley, N.Y.

[21] Appl. No.: 966,230

[22] Filed: Oct. 26, 1992

[30] Foreign Application Priority Data

Nov. 1, 1991 [EP] European Pat. Off. ........ 91810844.0

[51] Int. Cl.$^5$ .................. C08F 4/40; C08F 279/02
[52] U.S. Cl. ..................... 525/245; 525/246; 525/316; 525/369; 524/128
[58] Field of Search ............. 525/245, 316, 369, 246; 524/128

[56] References Cited

U.S. PATENT DOCUMENTS

| | | |
|---|---|---|
| 2,604,467 | 7/1952 | Crouch et al. ............... 528/496 |
| 3,238,275 | 3/1966 | Calvert . |
| 3,624,183 | 11/1971 | Leach et al. . |
| 5,135,986 | 8/1992 | Mülhaupt et al. ............ 525/310 |

FOREIGN PATENT DOCUMENTS

| | | |
|---|---|---|
| 0076162 | 9/1985 | European Pat. Off. . |
| 0332188 | 9/1989 | European Pat. Off. . |
| 0391178 | 10/1990 | European Pat. Off. . |
| 63-43562 | 2/1988 | Japan . |
| 63-126826 | 5/1988 | Japan . |

OTHER PUBLICATIONS

Encyclopedia of Polymer Science & Engineering vol. 1 (1985) pp. 388–426.
Encyclopedia of Polymer Science & Engineering vol. 6, pp. 1–28.
Ullmann's Encyclopedia of Industrial Chemistry pp. 277–295.
Chem. Absts. vol. 88, 1978.
Derwent Abst. 88-144385 (1988).
Derwent Abst. 86-315262 (1986).
Derwent Abst. 84-161047 (1984).

*Primary Examiner*—Vasu S. Jagannathan
*Attorney, Agent, or Firm*—Luther A. R. Hall

[57] ABSTRACT

A process for producing an emulsion graft copolymer, which comprises grafting a vinyl aromatic monomer and a comonomer onto a rubber latex in the presence of an iron (II) redox system as polymerization catalyst and coagulating the graft copolymer latex with an alkaline earth metal compound, characterized in that the pH of the coagulated slurry is adjusted to a value ranging from 8 to 12 a) by addition of an alkali metal hydroxide to the obtained slurry after coagulation,
b) by addition of an alkali metal hydroxide to the graft copolymer latex before coagulation, or
c) by coagulating the graft copolymer latex with an alkaline earth metal hydroxide, with the proviso that the solidified product of the slurry obtained according to a), b) or c) is not washed with acidified water in a subsequent processing step.

Graft copolymers are used e.g. for reinforcement of natural rubber, modification of rubber-based adhesives, in fibres, or in films.

12 Claims, No Drawings

PROCESS FOR PRODUCING AN EMULSION GRAFT COPOLYMER

The instant invention relates to a process for producing an emulsion graft copolymer and to compositions containing said copolymer.

Graft copolymers are used e.g. for reinforcement of natural rubber, modification of rubber-based adhesives, in fibres, or in films.

One of the most important techniques for the commercial production of graft copolymers is the emulsion polymerization which is described in detail e.g. in Encyclopedia Polymer Sci. Engng., J. Wiley 1985 Vol. 1, pages 388–426 and 1986, Vol. 6, pages 1 to 28; Ullmanns Encyclop. d. techn. Chemie (Ullmann's Encyclopedia of Industrial Chemistry), Verlag Chemie 1980, Vol. 19, pages 277–295, as well as in JP-A-Hei 1-297 402, JP-A-Hei 1-217 005 and EP-A-76 162.

The production of graft copolymers in emulsion involves two steps. First an elastomer latex is produced and in the following step resin forming monomers are grafted onto this elastomer latex. Typical grafting initiators are persulfates or redox systems based on Fe(II)/persulfate. The obtained graft copolymer latex is coagulated either by addition of acids, e.g. sulfuric or acetic acid, or by addition of salts such as $CaCl_2$ or $MgSO_4$.

The coagulated polymer is then washed, centrifuged and finally dried at elevated temperatures.

The acid coagulation often results in corrosion problems in the production plant as well as mold plate out and mold corrosion during processing of the finished polymer. Therefore, there is a general trend for replacing acidic coagulation by salt coagulation.

However, graft copolymers produced in an emulsion polymerisation process using Fe(II) redox systems as initiators and subsequently coagulated with an alkaline earth metal salt exhibit a poor thermal stability. For this reason, the coagulated polymer may easily oxidize during the drying operation and even may start burning. Such fires lead, in the worst case, to an explosion of the dryer and a production break.

Different approaches have been taken to solve this problem.

In JP-A-Hei 1-217 005 it is proposed to wash the dehydrated coagulate with water having a pH of 6.1 and an additional washing with water having a pH of 8.2 is described in JP-A-Hei 1-297 402.

According to the instant invention, there is provided a process for producing an improved emulsion graft copolymer, which comprises grafting a vinyl aromatic monomer and a comonomer onto a rubber latex in the presence of an iron (II) redox system as polymerization catalyst and coagulating the graft copolymer latex with an alkaline earth metal compound, characterized in that the pH of the coagulated slurry is adjusted to a value ranging from 8 to 12.

a) by addition of an alkali metal hydroxide to the obtained slurry after coagulation, b) by addition of an alkali metal hydroxide to the graft copolymer latex before coagulation, or c) by coagulating the graft copolymer latex with an alkaline earth metal hydroxide.

with the proviso that the solidified product of the slurry obtained according to a), b) or c) is not washed with acidified water in a subsequent processing step.

Acidified water is, in general, water which is adjusted to a pH smaller than 7, e.g. to a pH of from 1 to 6.9 or 1 to 6.8 or 3 to 6.5, by the addition of an anorganic or organic acid such as hydrochloric acid, sulfuric acid, phosphoric acid, acetic acid, boric acid or nitric acid, or acidic sodium sulfate.

As mentioned at the outset, the production of emulsion graft copolymers starts with polymerization, in emulsion, of elastomer latex particles which are the base for the graft phase. These elastomer particles consist of a diene rubber or an acrylic rubber or an ethylene/propylene/diene elastomer. Typical examples for the diene rubber are polybutadiene, polyisoprene and copolymers of butadiene with up to 35 percent by weight of a comonomer such as styrene, acrylonitrile, methylmethacrylate or a $C_1$–$C_6$alkyl acrylate.

Acrylic rubbers are preferably crosslinked emulsion polymerized $C_1$–$C_6$alkyl acrylates and copolymers thereof with up to 15 percent by weight of comonomers like styrene, methylmethacrylate, butadiene and a crosslinking comonomer such as divinylbenzene.

The preparation of the rubber substrate latex in an emulsion polymerization process is well known.

The ingredients for a typical emulsion-polymerization system normally include water, a monomer (e.g. butadiene) or a mixture of monomers (e.g. butadiene and styrene), emulsifiers and an initiator system and optionally chain-transfer agents, buffers as well as further additives commonly used.

In conventional emulsion polymerization, a hydrophobic monomer such as butadiene is emulsified in an aqueous phase with an oil-in-water emulsifier. The polymerization is usually carried out with a water-soluble initiator system.

Suitable emulsifiers are e.g. anionic surfactants such as rosin soap or alkali metal oleates, stearates, or n-higher alkylsulfonates and blends thereof.

The polymerization can be initiated e.g. by alkali metal persulfates.

Chain-transfer agents, usually a mercaptan such as t-dodecylmercaptan, control the molecular weight of the elastomer particles.

Suitable buffers are e.g. alkali metal hydroxides and pyrophosphates.

The ingredients, the manner in which they are added to the reactor, the reactor design and the operating procedures all influence the characteristics of the obtained rubber substrate latex.

Typical particle diameters found in an elastomer latex are e.g. 0.05 to 5 μm, especially 0.1 to 1 μm. The desired particle size can be obtained before grafting by direct growth or agglomeration of the smaller particles.

In a subsequent reaction which is well known a vinyl aromatic monomer, e.g. styrene, α-methylstyrene, p-methylstyrene or vinyltoluene, and a comonomer, e.g. acrylonitrile, methyl methacrylate, maleic anhydride, maleinimide or N-phenylmaleinimide or blends thereof, are grafted onto the elastomer particles described above.

Preferred examples for the grafted copolymers are styrene/acrylonitrile copolymers, styrene/methyl methacrylate copolymers, styrene/maleic anhydride copolymers, styrene/maleinimide copolymers and styrene/N-phenylmaleinimide copolymers and the corresponding α-methylstyrene copolymers. Styrene/acrylonitrile copolymers are especially preferred.

In general, the emulsion graft polymerization system contains water, elastomer substrate latex or a mixture of substrate latices with different particles size distribution, vinyl aromatic monomers, comonomers, emulsifiers and an iron (II) redox system as polymerization catalyst as well as optionally chain-transfer agents, buffers and further additives commonly used.

The solid content (rubber, aromatic vinyl monomer, and comonomer) of the formulation is usually between e.g. 20 to 70%. The rubber proportion can range from about e.g. 5 to 90%, preferably 10 to 80% of the rubber-aromatic vinyl monomer-comonomer charge. The aromatic vinyl monomer-comonomer weight ratio is usually between e.g. 1 to 8, preferably 1 to 5.

Examples for typical emulsifiers, chain-transfer agents and buffers are already listed above.

Common Fe (II) redox systems are for example Fe (II)/alkali metal persulfate, Fe (II)/glucose, Fe (II)/alkali metal sulfoxylate, Fe (II)/alkali metal pyrophosphate. Fe (II) is preferably present in the form of $FeSO_4$. If desired, the Fe (II) redox system can be used in combination with an organic peroxide such as cumene hydroperoxide, diisopropylbenzene hydroperoxide or p-methane hydroperoxide. A preferred Fe (II) redox/organic peroxide system contains $FeSO_4$, glucose, Na-pyrophosphate and cumene hydroperoxide.

The temperature of the graft polymerization reaction is normally between e.g. 20° to 100° C., preferably 40° to 85° C. If desired, the polymerization can be carried out under an inert gas such as nitrogen.

The coagulation of the graft copolymer latex is carried out with alkaline earth metal compounds, e.g. salts such as $MgSO_4$ or $CaCl_2$, or hydroxides such as Ca(OH)$_2$. In general, e.g. 0.5 to 10%, based on the weight of the dry graft copolymer, of alkaline earth metal compounds are required. The coagulation temperature is from e.g. 20° to 100° C., preferably 50° to 100° C.

According to the instant invention, the pH of the coagulated slurry is adjusted to a value of from 8 to 12, for example 8.5 to 12 or 9 to 12 or 9.5 to 12 or 10 to 12 or 9 to 11.5.

The pH of the slurry is nearly independent of the temperature but the above values preferably relate to a temperature of about 70° to 90° C.

In a preferred embodiment of the instant invention, the alkali metal hydroxide is added to the graft copolymer latex before coagulation. In this case, the required amount of hydroxide can easily be determined by experiment. Thus, a sample of the latex is coagulated. Subsequently, the amount of the alkali metal hydroxide being added to adjust the slurry to the desired pH can be detected and the amount required for the latex batch is calculated.

In a further preferred embodiment of the instant invention, the pH of the slurry is adjusted to a value of from 11 to 12 by coagulation with an alkaline earth metal hydroxide, preferably Ca(OH)$_2$.

After coagulation, the slurry is conveniently washed with water to neutral pH and de-watered in a centrifuge. Resin drying can be accomplished in one or more stages. Pre-drying of the absorbed water can be done e.g. in flash-type dryers. Final drying of the resin is generally done in e.g. fluid bed or rotary-type dryers. Thermal stability of the resin must be considered in the drying step to prevent oxidative degradation and fires.

Conventional stabilizers, for example antioxidants, metal deactivators, phosphites, phosphonites and/or peroxide-destroying compounds, are generally added to the latex before coagulation to provide thermal stability for subsequent processing and for stability of the final product.

Normally, these known stabilizers are employed in from about 0.01 to about 10% by weight of the dry resin. The stabilizers are preferably incorporated in the form of an emulsion. Examples of the various conventional stabilizers are:

1. Antioxidants 1.1. Alkylated monophenols, for example 2,6-di-tert-butyl-4-methyl-phenol, 2-tert-butyl-4,6-dimethylphenol, 2,6-di-tert-butyl-4-ethylphenol, 2,6-di-tert-butyl-4-n-butylphenol, 2,6-di-tert-butyl-4-iso-butylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexyl-phenol, 2,6-di-tert-butyl-4-methoxymethylphenol, 2,6-di-nonyl-4-methylphenol.

1.2. Alkylated hydroquinones, for example 2,6-di-tert-butyl-4-methoxy-phenol, 2,5-di-tert-butylhydroquinone, 2,5-di-tert-amylhydroquinone, 2,6-diphenyl-4-octadecyloxyphenol.

1.3. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol).

1.4. Alkylidenebisphenols, for example 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis-(3'-tert-butyl-4'-hydroxyphenyl)butyrate], bis(3-tert-butyl-4-hydroxy-5-methylphenyl)dicyclopentadiene, bis[2-(3'-tert-butyl-2'-hydroxy-5'-methylbenzyl)-6-tert-butyl-4-methylphenyl]terephthalate.

1.5. Benzyl compounds, for example 1,3,5-tris(3,5-di-tert-butyl-4-hydroxybenzyl)-2,4,6-trimethylbenzene, bis(3,5-di-tert-butyl-4-hydroxy-benzyl) sulfide, isooctyl 3,5-di-tert-butyl-4-hydroxybenzylmercapto-acetate, bis(4-tert-butyl-3-hydroxy-2,6-dimethylbenzyl) dithiol-terephthalate, 1,3,5-tris(3,5-di-tert-butyl-4-hydroxybenzyl) isocyanurate, 1,3,5-tris(4-tert-butyl-3-hydroxy-2,6-dimethylbenzyl) isocyanurate, dioctadecyl 3,5-di-tert-butyl-4-hydroxybenzylphosphonate, calcium salt of monoethyl 3,5-di-tert-butyl-4-hydroxybenzylphosphonate, 1,3,5-tris-(3,5-dicyclohexyl-4-hydroxybenzyl)isocyanurate.

1.6. Acylaminophenols, for example lauric acid 4-hydroxyanilide, stearic acid 4-hydroxyanilide, 2,4-bis(octylmercapto)-6-(3,5-di-tert-butyl-4-hydroxyanilino)-s-triazine, octyl N-(3,5-di-tert-butyl-4-hydroxyphenyl)-carbamate.

1.7. Esters of β-(3,5-di-tert-butyl-4-hydroxyphenyl)-propionic acid with mono- or polyhydric alcohols, e.g. with methanol, diethylene glycol, octadecanol, triethylene glycol, 1,6-hexanediol, pentaerythritol, neopentyl glycol, tris(hydroxyethyl) isocyanurate, thiodiethylene glycol, N,N'-bis(hydroxyethyl)oxalic acid diamide.

1.8. Esters of β-(5-tert-butyl-4-hydroxy-3-methylphenyl)propionic acid with mono- or polyhydric alcohols, e.g. with methanol, diethylene glycol, octadecanol, triethylene glycol, 1,6-hexanediol, pentaerythritol, neopentyl glycol, tris(hydroxyethyl) isocyanurate, thiodiethylene glycol, N,N'-bis(hydroxyethyl)oxalic acid diamide.

1.9. Esters of β-(3,5-dicyclohexyl-4-hydroxyphenyl)propionic acid with mono- or polyhydric alcohols, e.g. with methanol, diethylene glycol, octadecanol, triethylene glycol, 1,6-hexanediol, pentaerythritol, neopentyl glycol, tris(hydroxyethyl) isocyanurate, thiodiethylene glycol, N,N'-bis(hydroxyethyl)oxalic acid diamide.

1.10. Amides of β-(3,5-di-tert-butyl-4-hydroxyphenyl)propionic acid e.g. N,N'-bis(3,5-di-tert-butyl-4-hydroxyphenylpropionyl)hexamethylene-diamine, N,N'-bis(3,5-di-tert-butyl-4-hydroxyphenylpropionyl)-tri-methylene-diamine, N,N'-bis(3,5-di-tert-butyl-4-hydroxyphenylpropionyl)-hydrazine.

2. Metal deactivators, for example N,N'-diphenyloxalic acid diamide, N-salicylal-N'-salicyloylhydrazine, N,N'-bis(salicyloyl)hydrazine, N,N'-bis(3,5-di-tert-butyl-4-hydroxyphenylpropionyl)hydrazine, 3-salicyloylamino-1,2,4-triazole, bis-(benzylidene)oxalodihydrazide.

3. Phosphites and phosphonites, for example triphenyl phosphite, diphenyl alkyl phosphites, phenyl dialkyl phosphites, tris(nonylphenyl) phosphite, trilauryl phosphite, trioctadecyl phosphite, distearyl pentaerythritol diphosphite, tris(2,4-di-tert-butylphenyl) phosphite, diiso- decyl pentaerythritol diphosphite, bis(2,4-di-tertbutylphenyl) pentaerythritol diphosphite, tristearyl sorbitol triphosphite, tetrakis(2,4-di-tert-butylphenyl) 4,4'-biphenylene diphosphonite, 3,9-bis(2,4-di-tert-butylphenoxy)-2,4,8,10-tetraoxa-3,9-diphosphaspiro[5.5]undecane.

4. Peroxide decomposers, for example esters of β-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(β-dodecyl-mercapto)propionate.

The concomitant use of phenolic antioxidants and of phosphites, phosphonites or peroxide decomposers is of particular importance.

It is also possible to add other auxiliaries conventionally used in plastics technology, for example pigments, fillers, reinforcing agents, lubricants, flameproofing agents or blowing agents.

The emulsion graft copolymer obtained according to the instant invention preferably has an elastomer content of 10 to 80% by weight of the dry resin. When the elastomer content is inferior or equal to 30%, e.g. 10 to 30%, the graft copolymer can be used as such after compounding in an extruder or bamburry.

However, the graft copolymer with a considerable elastomer content (>30%) is conveniently blended with separately prepared polymers or copolymers to obtain a final elastomer content of 5 to 30%. Typical examples of such polymers or copolymers are polyvinyl chloride, polyesters, styrene/acrylonitrile copolymers, α-methylstyrene/acrylonitrile copolymers, styrene/maleic anhydride copolymers, α-methylstyrene/acrylonitrile/methacrylate copolymers, styrene/N-substituted maleinimide copolymers or blends thereof.

Several preferred embodiments of the instant invention are listed below.

A) The instant process wherein the pH of the coagulated slurry is adjusted to a value ranging from 9 to 12 by addition of an alkali metal hydroxide to the obtained slurry after coagulation.

B) The instant process wherein the pH of the coagulated slurry is adjusted to a value ranging from 8.5 to 12 by addition of an alkali metal hydroxide to the graft copolymer latex before coagulation.

C) The instant process wherein the graft copolymer latex is coagulated with $MgSO_4$ or $CaCl_2$, characterized in that KOH or NaOH is added to the obtained slurry after coagulation.

D) The instant process wherein the graft copolymer latex is coagulated with $MgSO_4$ or $CaCl_2$, characterized in that KOH or NaOH is added to the graft copolymer latex before coagulation.

E) The instant process wherein the graft copolymer latex is coagulated with $Ca(OH)_2$.

F) The instant process wherein the iron (II) redox polymerization catalyst contains a persulfate, glucose, a sulfoxylate or a pyrophosphate each optionally in combination with an organic peroxide.

G) The instant process wherein the coagulation is carried out at a temperature of from 20° to 100° C.

H) The instant process wherein the latex is an acrylonitrile/butadiene/styrene graft copolymer latex or a methyl methacrylate/butadiene/styrene graft copolymer latex.

I) The instant process wherein an antioxidant optionally combined with an organic phosphite stabilizer or a peroxide decomposer is added to the graft copolymer latex before coagulation.

J) A compounded resin comprising an emulsion graft copolymer produced according to the instant invention and a styrene/acrylonitrile copolymer, polyvinyl chloride or a styrene maleic anhydride copolymer.

In order to illustrate the present invention, several examples are shown below; these examples are given by way of illustration only and do not imply any restriction.

In the Examples, "parts" are parts by weight and "%" is % by weight, unless stated otherwise.

The average particle size indicated in the following examples is measured by the Nanosizer of ®Coal Tar Electric Co., USA.

I) Preparation of butadiene/styrene copolymer rubber latex with an average particle size of 0.07 μm (Latex A-1).

| | |
|---|---|
| 125.4 kg | of deionized water, |
| 3.4 kg | of sodium salt of higher aliphatic acids, |
| 0.680 kg | of sodium pyrophosphate, |
| 0.255 kg | of sodium hydroxide, |
| 1.7 kg | of styrene, |
| 0.051 kg | of t-dodecylmercaptan, |
| 15.3 kg | of butadiene, and |
| 0.1275 kg | of potassium persulfate | are charged into a 300 l reactor provided with a stirrer, heating and cooling equipments, and a raw material supplying tube. The polymerization starts at 67° C.

After one hour from the initiation of the polymerization

| | |
|---|---|
| 6.8 kg | of styrene, |
| 0.204 kg | of t-dodecylmercaptan, and |

-continued 61.2 kg of butadiene are added at this temperature within 5 hours. Within further 1.5 hours, the temperature is raised from 67° C. to 80° C. and the reaction is continued for 2.5 hours. Then, the temperature is lowered to room-temperature to obtain the butadiene/styrene copolymer latex. The average particle size is 0.07 μm and the solid content is 40.75%.

II) Preparation of butadiene/styrene copolymer rubber latex with an average particle size of 0.25 μm (Latex B-1).

14.7 kg of Latex A-1 and 2.5 kg of deionized water are charged into a 40 l reactor equipped with a stirrer, heating and cooling apparatus, and a raw material supplying tube. Then, 72 g of acetic anhydride and 1.4 kg of deionized water are added and mixed at 40° C. After stirring and mixing for about 1 minute, the mixture is allowed to stand for 10 minutes. Then, 30 g of the sodium salt of a condensate of beta-naphthalene sulfonic acid and formaldehyde; 110 g of potassium hydroxide (48%) and 880 g of deionized water are added, while stirring. A butadiene/styrene copolymer rubber latex with an average particle size of 0.25 μm is obtained. The pH of this latex is 7.5 and the solid content is 29.1%.

III) Preparation of butadiene/styrene copolymer rubber latex with an average particle size of 0.65 μm (Latex B-2).

14.7 kg of Latex A-1, 3.21 kg of deionized water are charged into a 40 l reactor equipped with a stirrer, heating and cooling apparatus, and a raw material supplying tube. Then, 126 g of acetic anhydride and 3.1 kg of deionized water are added and mixed at 25° C. After stirring and mixing for about 1 minute, the mixture is allowed to stand for 30 minutes. Then, 90 g of the sodium salt of a condensate of beta-naphthalene sulfonic acid and formaldehyde; 180 g of potassium hydroxide and 1.5 kg of deionized water are added, while stirring. A butadiene/styrene copolymer rubber latex with an average particle size of 0.65 μm is obtained. The pH of the latex is 7.2 and the solid content is 27.3%.

IV) Preparation of butadiene/styrene/acrylonitrile graft copolymer latex (Latex C-1)

| | |
|---|---|
| 13.7 kg | of Latex B-1, |
| 3.66 kg | of Latex B-2, |
| 0.48 g | of ferrous sulfate, |
| 38.4 g | of glucose, |
| 24.0 g | of sodium pyrophosphate, and |
| 0.620 kg | of deionized water | are charged into a 40 l reactor equipped with a stirrer, heating and cooling apparatus, and a raw material supplying tube. The temperature is raised to 60° C., and

| | |
|---|---|
| 24 g | of cumene hydroperoxide, |
| 110 g | of rosin soap, |
| 220 g | of potassium hydroxide (10%), |
| 1.6 kg | of deionized water, |
| 3.36 kg | of styrene, |
| 1.44 kg | of acrylonitrile, and |
| 48 g | of t-dodecylmercaptan | are continuously added during 2 hours and 45 minutes. During this period, within the first 30 minutes, the temperature is raised from 60° to 70° C. After the addition of the reagents, graft copolymerization is continued for further 15 minutes at 70° C. The obtained butadiene/styrene acrylonitrile graft copolymer latex has a pH of 9.2 and a solid content of 39.1%.

The above preparations I to IV are disclosed in Example 3 of JP-A-Hei 1-297 402 and JP-A-Hei 1-217 005.

V) Preparation of the stabilizer emulsions:

Emulsion-1:

100 g of a stabilizer mixture (triethylene glycol-bis-[3-(3'-tert-butyl-4'-hydroxy-5'-methylphenyl)-propionate] and tris-[nonylphenyl]-phosphite in a ratio by weight of 3 to 10) and 10 g of stearic acid are first melt at 100° C. and subsequently cooled to 80° C. A solution of 2 g of potassium hydroxide in 75 g of water, heated to 80° C., is slowly added under vigorous stirring. Further 125 g of water heated to 80° C. are gradually added under stirring. The obtained emulsion is stored at 50° C.

Emulsion-2:

This emulsion is prepared in analogy to Emulsion-1 but using a stabilizer mixture consisting of triethylene glycol-bis-[3-(3'-tert-butyl-4'-hydroxy-5'-methylphenyl)-propionate] and dilauryl thiodipropionate in a ratio by weight of 3 to 5.

EXAMPLE 1

500 g of deionized water and 1.3 g of magnesium sulfate (5% based on the dry resin) are charged into a reactor equipped with a stirrer, heating and cooling apparatus, and a raw material supplying tube, and are heated to 90° C. 100 g of Latex C-1 stabilized with Emulsion-1 or Emulsion-2 and heated to 50° to 55° C., are added within 1 to 2 minutes, while stirring at about 1000 rpm. The resulting mixture is heated again to 90° to 95° C. and allowed to stand at this temperature for 10 minutes. The coagulum is separated off hot by a suction pump, washed until neutral, and dried at 60° C. and 150 mbar for 15 hours.

The pH of the slurry is modified by addition of an aqueous NaOH solution (2N) to the stabilized latex before coagulation or to the slurry after coagulation.

When the aqueous NaOH solution is added to the stabilized latex before coagulation, the required amount of NaOH is determined by experiment. Thus, a sample of the latex is coagulated; subsequently, the amount of NaOH being added to adjust the slurry to the desired pH is detected and the amount required for the total latex is calculated.

The effect of the pH of the slurry on the thermal stability of the resin in differential thermal analysis (DTA) is shown in Table 1.

In DTA, the temperature dependence of a sample in air (50 ml/min) at 180° C. is determined. A characteristic change in the temperature curve is observed, when the polymer undergoes degradation which is correlated to an exothermal reaction. The time Tm which is required to reach the maximum of the exothermal reaction is a measure for the thermal stability of the polymer. The longer the time to reach the maximum of the exothermal reaction, the better the thermal stability.

TABLE 1

The tested coagulated sample is stabilized with 0.3% of triethylene glycol-bis-[3-(3'-tert-butyl-4'-hydroxy-5'-methylphenyl)-propionate] and 1% of tris-[nonylphenyl]-phosphite, based on the dry resin.

| Example | pH modification. | pH of slurry at 80° C. | DTA, 180° C. in air, Tm (minutes). |
|---|---|---|---|
| — | Without. | 7 | 17 |
| 1a | Addition of NaOH to the slurry after | 9 | 69 |

TABLE 1-continued

The tested coagulated sample is stabilized with 0.3% of triethylene glycol-bis-[3-(3'-tert-butyl-4'-hydroxy-5'-methylphenyl)-propionate] and 1% of tris-[nonylphenyl]-phosphite, based on the dry resin.

| Example | pH modification. | pH of slurry at 80° C. | DTA, 180° C. in air, Tm (minutes). |
|---|---|---|---|
| | coagulation. | | |
| 1b | Addition of NaOH to the stabilized latex before coagulation. | 9 | 93 |

TABLE 2

The tested coagulated sample is stabilized with 0.3% of triethylene glycol-bis-[3-(3'-tert-butyl-4'-hydroxy-5'-methylphenyl)-propionate] and 0.5% of dilauryl thiodipropionate, based on the dry resin.

| Example | pH modificaation. | pH of slurry at 80° C. | DTA, 180° C. in air, Tm (minutes). |
|---|---|---|---|
| — | Without. | 7 | 17 |
| 1c | Addition of NaOH to the stabilized latex before coagulation. | 9 | 96 |

EXAMPLE 2

1000 g of deionized water and 1% of calcium hydroxide, based on the dry resin, are charged into a reactor equipped with a stirrer, heating and cooling apparatus, and a raw material supplying tube, and heated to 90° C. 200 g of Latex C-1 stabilized with Emulsion-1 and heated to 50° to 55° C., are added within 1 to 2 minutes, while stirring at about 1000 rpm. The resulting mixture is heated again to 90° to 95° C. and allowed to stand at this temperature for 10 minutes. The obtained slurry has a pH of 11.5. The coagulum is separated off hot by a suction pump, washed until neutral, and dried at 60° C. and 150 mbar for 15 hours.

The coagulate which is stabilized with 0.3% of triethylene glycol-bis-[3-(3'-tert-butyl-4'-hydroxy-5'-methylphenyl)-propionate] and 1% of tris-[nonylphenyl]-phosphite, based on the dry resin, shows a Tm value of 78 minutes in differential thermal analysis at 180° C. in air (50 ml/min).

EXAMPLE 3

A mixture of 50 g of acrylonitrile/butadiene/styrene (ABS) graft copolymer crumbs obtained according to instant example 1 b and 50 g of styrene/acrylonitrile copolymer is compounded with 1% of ethylene bis-[stearamide] and 1% of magnesium stearate (based on the dry resin) on a two roll mill at 170° C./180° C. for 4 minutes. Samples (40 mm × 40 mm × 2 mm) are compression molded from the milled sheets at 180° C. in 3 minutes and then thermally stressed at 160° C. in a test oven. The Yellowness Index (YI) of the samples which is determined according to ASTM D 1925 at regular time intervals is shown in Table 4. Low YI values indicate a good thermal stability of the resin.

TABLE 4

| pH modification of the ABS slurry*). | Yellowness Index after minutes at 160° C. | | | | | |
|---|---|---|---|---|---|---|
| | 0 | 15 | 30 | 45 | 60 | 90 |
| Without. | 37 | 45 | 52 | 59 | 65 | 72 |
| See Example 1b. | 31 | 39 | 45 | 50 | 57 | 62 |

*)Stabilized with 0.3% of triethylene glycol-bis-[3-(3'-tert-butyl-4'-hydroxy-5'-methylphenyl)-propionate] and 1% of tris-[nonylphenyl]-phosphite, based on the dry ABS.

The data shown in Table 4 reveal that the pH modification of the ABS slurry results also in a significant color improvement of the compounded ABS.

We claim:

1. A process for producing an emulsion graft copolymer, which comprises grafting a vinyl aromatic monomer and a comonomer onto a rubber latex in the presence of an iron (II) redox system as polymerization catalyst and coagulating the graft copolymer latex as a slurry with an alkaline earth metal compound, characterized in that the pH of the coagulated slurry is adjusted to a value ranging from 8 to 12.
   a) by addition of an alkali metal hydroxide to the obtained slurry after coagulation, or
   b) by addition of an alkali metal hydroxide to the graft copolymer latex before coagulation, or
   c) by coagulating the graft copolymer latex with an alkaline earth metal hydroxide,
   with the proviso that the solidified product of the slurry obtained according to a), b) or c) is not washed with acidified water in a subsequent processing step.

2. The process according to claim 1 wherein the pH of the coagulated slurry is adjusted to a value ranging from 9 to 12 by addition of an alkali metal hydroxide to the obtained slurry after coagulation.

3. The process according to claim 1 wherein the pH of the coagulated slurry is adjusted to a value ranging from 8.5 to 12 by addition of an alkali metal hydroxide to the graft copolymer latex before coagulation.

4. The process according to claim 1 wherein the graft copolymer latex is coagulated with $MgSO_4$ or $CaCl_2$, characterized in that KOH or NaOH is added to the obtained slurry after coagulation.

5. The process according to claim 1 wherein the graft copolymer latex is coagulated with $MgSO_4$ or $CaCl_2$, characterized in that KOH or NaOH is added to the graft copolymer latex before coagulation.

6. The process according to claim 1 wherein the graft copolymer latex is coagulated with $Ca(OH)_2$.

7. The process according to claim 1 wherein the iron (II) redox polymerization catalyst contains a persulfate, glucose, a sulfoxylate or a pyrophosphate.

8. The process according to claim 7 wherein the iron (II) redox polymerization catalyst contains additionally an organic peroxide.

9. The process according to claim 1 wherein the coagulation is carried out at a temperature of from 20° to 100° C.

10. The process according to claim 1 wherein the latex is an acrylonitrile/butadiene/styrene graft copolymer latex or a methyl methacrylate/butadiene/styrene graft copolymer latex.

11. The process according to claim 1 wherein an antioxidant is added to the graft copolymer latex before coagulation.

12. The process according to claim 11 wherein an organic phosphite stabilizer or a peroxide decomposer is additionally added to the graft copolymer latex before coagulation.

* * * * *